April 5, 1960   H. A. MACKIE   2,931,452
HOOD MEANS FOR INDUSTRIAL TRUCKS AND THE LIKE
Filed May 18, 1956   5 Sheets-Sheet 3

INVENTOR.
HARRY A. MACKIE
BY
J. Frederick Bechtel
ATTY.

April 5, 1960 H. A. MACKIE 2,931,452
HOOD MEANS FOR INDUSTRIAL TRUCKS AND THE LIKE
Filed May 18, 1956 5 Sheets-Sheet 4

INVENTOR.
HARRY A. MACKIE
BY
ATTY.

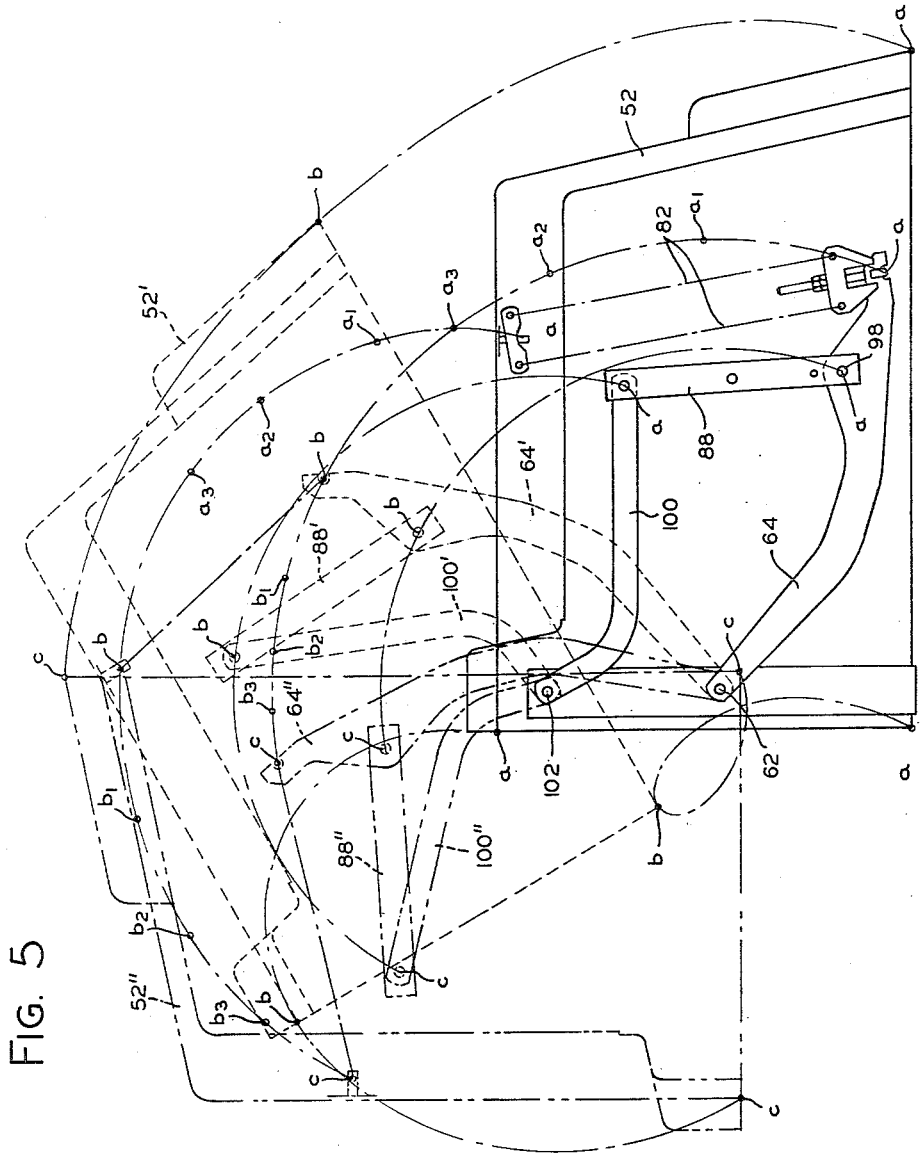

United States Patent Office 2,931,452
Patented Apr. 5, 1960

2,931,452
HOOD MEANS FOR INDUSTRIAL TRUCKS AND THE LIKE

Harry A. Mackie, Wayne County, Mich., assignor to Clark Equipment Company, a corporation of Michigan Application May 18, 1956, Serial No. 585,777

10 Claims. (Cl. 180—69)

This invention relates to industrial trucks, and more particularly is concerned with a hood hinging and mounting arrangement on such trucks.

Industrial trucks of the type herein disclosed have long been utilized for handling a variety of objects and materials in industrial and many other applications. Heretofore, however, easy accessibility to and maintenance of the power plant of such trucks have been considerably hampered by the fact that the hood member for covering the power plant has generally not been movable out of the vicinity thereof without complete removal from the truck body or frame of such hood member. As a result, in addition to the time and effort required to remove and replace such a hood member in order to gain access to the power plant, operators often acquired a distinct tendency to allow the power plant to be operated for extended periods of time beyond that which was desirable because of the relative difficulty with which access to it could be had.

In order to alleviate this condition, it is desirable that some means be provided which permits the hood member for such a truck to be readily moved out of the vicinity of the power plant so that easy access thereto may be had without removing such hood member from the truck.

The present invention contemplates broadly the provision of a box-like hood member supported upon laterally spaced frame members by a linkage means in such a manner that the hood member may be raised from the normal lowered position to a substantially vertical position in which it is out of the immediate power plant area.

In order to facilitate raising and lowering of the hood with a minimum of effort, there are provided springs which are arranged between the hood and linkage means so that a gravity opposing counterweight effect of the springs on the hood is realized irrespective of the angular position thereof. When the hood is raised from a horizontal to a substantially vertical position the springs continuously urge the hood member along an upwardly and rearwardly extending arc until a substantially vertical position thereof exists in which the springs then urge the hood member in the opposite direction along such an arc. Thus the springs and associated linkage are adapted to continuously assist an operator in raising and lowering the hood member. In order to facilitate such hood movement as above described, the hood linkage means is designed to permit a rearwardly facing open end of the hood member to move downwardly over the rear portion of the truck as said hood member is actuated towards a vertical position.

Other objects and advantages of the present invention will appear more fully from the following detailed description which when taken in conjunction with the accompanying drawings, will describe to those skilled in the art the particular construction and operation of a preferred form thereof.

The present invention generally comprises a rotatable hood member which is pivotally mounted on link means which are in turn pivotally mounted on the truck frame, and spring means connecting the link means and the hood member in such a manner that the above described general mode of operation is realized.

In the drawings:

Figure 5 is a schematized version of the structure shown in Figure 3 in which the movements of the various elements thereof are traced in broken lines during movement of the hood member from one limiting position to another.

Figure 1:
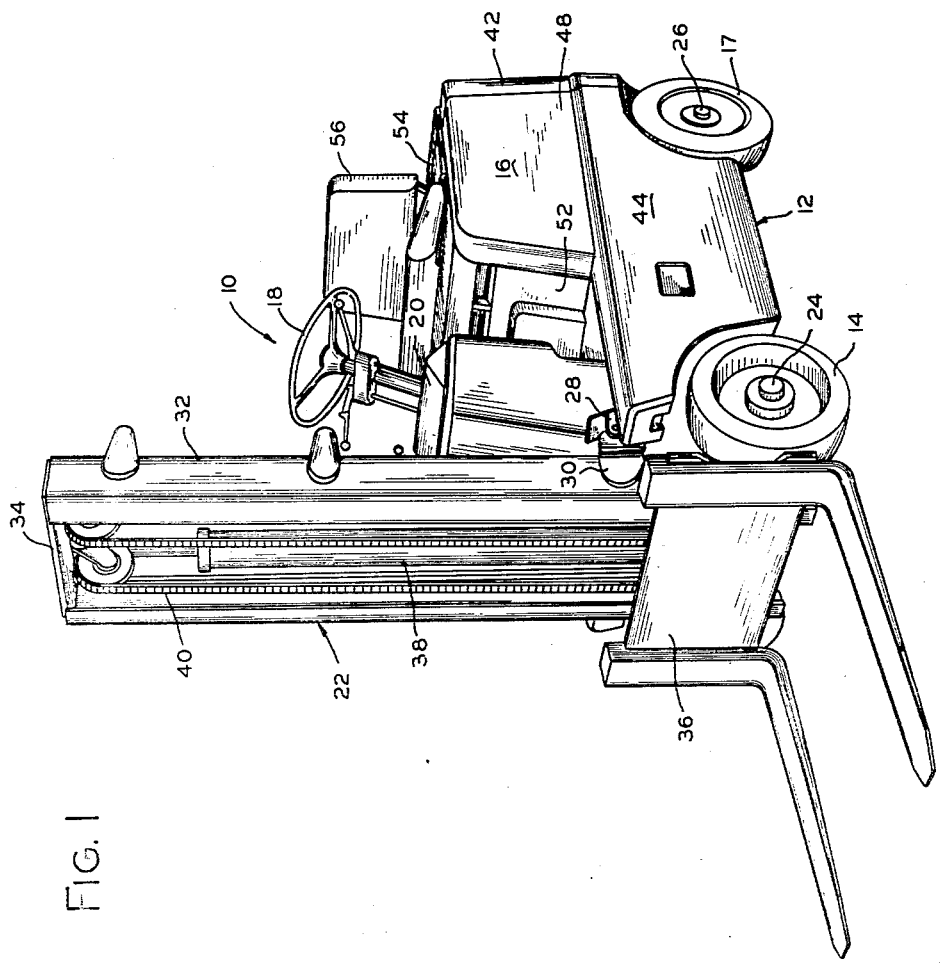
Figure 1 is a perspective view of an industrial truck having the hood member and control linkage means therefor of this invention.
Figure 2:
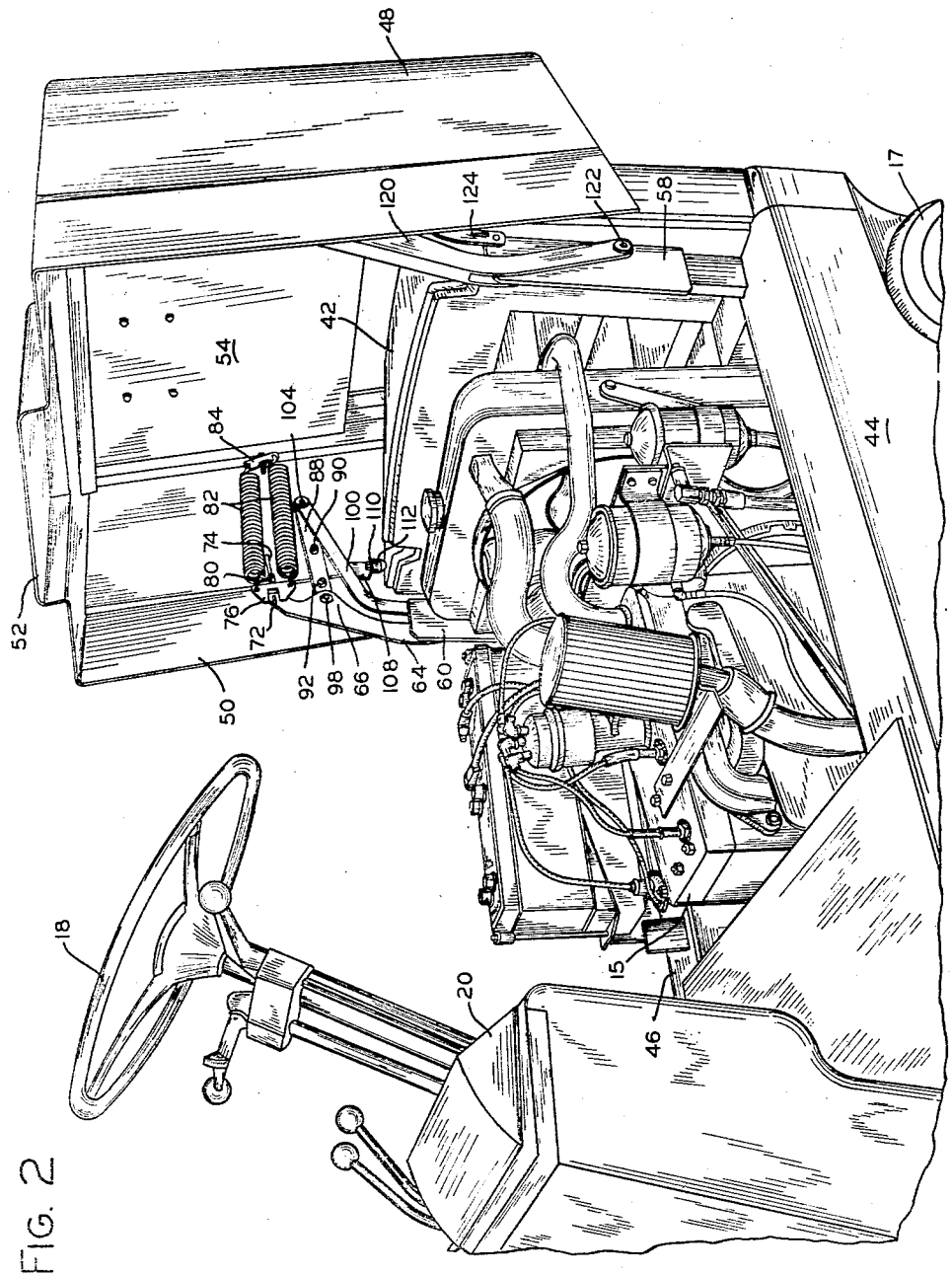
Figure 2 is a perspective view of the truck of Figure 1 with the hood member shown in a raised position.

Referring now to Figures 1 and 2, numeral 10 indicates generally an industrial lift truck. The vehicle includes a body portion 12 which is mounted on four wheels in the usual manner.

In the truck illustrated, the front wheels 14 are drive wheels which are driven by prime mover means such as an internal combustion engine 15 located within the body portion 12 and under a hood structure or member 16 to be hereinafter described in detail. Connected to and operatively associated with the engine 15 are a plurality of component mechanisms and accessories for the operation of the engine and truck which it is not necessary to describe herein; all of such mechanisms and accessories are normally covered by hood member 16 as illustrated in Figure 1. The rear wheels 17 (only one of which is visible) are dirigible wheels and are connected to an operator's steering wheel 18 by means of a conventional linkage for steering the vehicle. Various truck and engine controls operating condition indicators are located on the steering post and on or adjacent to a dash board 20.

At the forward end of the body portion 12 is located a vertically disposed telescope mast structure indicated generally at 22. This mast is pivotally mounted at its lower end on laterally spaced bearing portions of a front axle housing in which is mounted a drive axle 24 and which assists a rear axle means 26 in supporting the body of the truck. The mast 22 is arranged to be tilted forwardly and rearwardly by conventional means, including link and bracket means 28 and 30 which are connected between truck mounted hydraulic cylinder means (not shown) and the mast structure at each side thereof. The mast structure 24 includes an outer guide way formed by a pair of channel members 32 and an inner slide member 34 which telescopes within the outer guide structure and on which is mounted the usual load engaging fork and carriage means 36 for actuation upwardly by hoist and chain means 38 and 40.

On the rear end of the truck 10 is mounted a counterweight 42 which is secured to the frame of the truck in order to counterbalance loads which are carried on the fork tines at the front of the truck. The frame 12 includes a pair of laterally spaced and longitudinally extending members 44 and 46 which are suitably mounted on the truck axle housings.

The hood means 16 comprises a fabricated metal box-shaped member having a pair of laterally spaced and normally longitudinally extending side plate members 48 and 50 which are adapted to overlie a substantial portion of the longitudinal frame members 44 and 46 when the hood is in the down position shown in Figure 1, and which are connected by transversely extending forward and upper plate members 52 and 54, respectively. Suitably mounted on top of the normally horizontally extending plate member 54 is an operator's seat 56. The three plate members 48, 50 and 54 of hood 16 define along the joined rearwardmost edge thereof a transverse opening which normally lies adjacent the forward face of counterweight 42, said opening permitting the hood to be actuated upwardly and rearwardly to the position illustrated in Figure 2 wherein a substantial portion of the counterweight is bounded by the hood plate members.

Referring now to Figures 2 through 5, a pair of laterally spaced vertically extending support members 58 and 60 are mounted adjacent the rear ends of frame members 44 and 46. A linkage mechanism is pivotally connected between each of the support members 58 and 60 and the hood 16, and in addition, resilient means connects one of said linkage mechanisms to the hood member, which construction will now be described in detail.

Pivotally mounted on support member 60 at a pivot pin means 62 is an elongated and normally generally downwardly and forwardly extending curved link member 64 having a humped portion 66 formed in an upper portion thereof and extending forwardly therefrom, and having an end portion 68 in which is located a transverse slot 70 which receives a hooked end 72 of a bolt member 74 on which is mounted a plate 76 having a transversely extending threaded block portion 78 in registry with the bolt 74. The axial position of plate 76 along bolt 74 is made adjustable by nuts 80. A pair of tension springs 82 are connected by means of hooked portions formed at one end thereof to plate 76 as shown, and are similarly connected at the opposite ends thereof to a spring retainer member 84 which is retained in the position shown by a bracket member 86 which is rigidly attached to the side 50 of hood 52. The positions of retention of the opposite ends of the springs 82 are such that the springs are always equal in length irrespective of variations in the angular position of the hood member.

A bar member 88 is rigidly connected to side plate member 50 by means of bolts 90 and 92 and has formed at the lower end thereof an inwardly and then downwardly extending portion 94, 96 to which is pivotally connected the hump portion 66 of link 64 by means of a pivot pin and washer means 98. The bar member 88 is also connected at the upper end thereof to a normally downwardly and then forwardly extending stabilizing link member 100 which is pivotally connected at one end thereof to support member 60 by means of pivot means 102 and which is pivotally connected at its opposite end by means of pivot means 104 to an end portion 106 of bar 88, said end 106 being inwardly and then upwardly bent in a manner similar to end portion 94, 96 of said bar member so as to minimize the area of contact between the bar member and the links. Rigidly connected to the link 100, as by welding, is a plate member 108 having a portion 110 extending inwardly at right angles thereto and on which is bolted a resilient stop member 112 which is adapted to abut an upper surface portion of counterweight 42, as shown in Figure 2, for limiting the extreme raised position of the hood.

Figure 4:
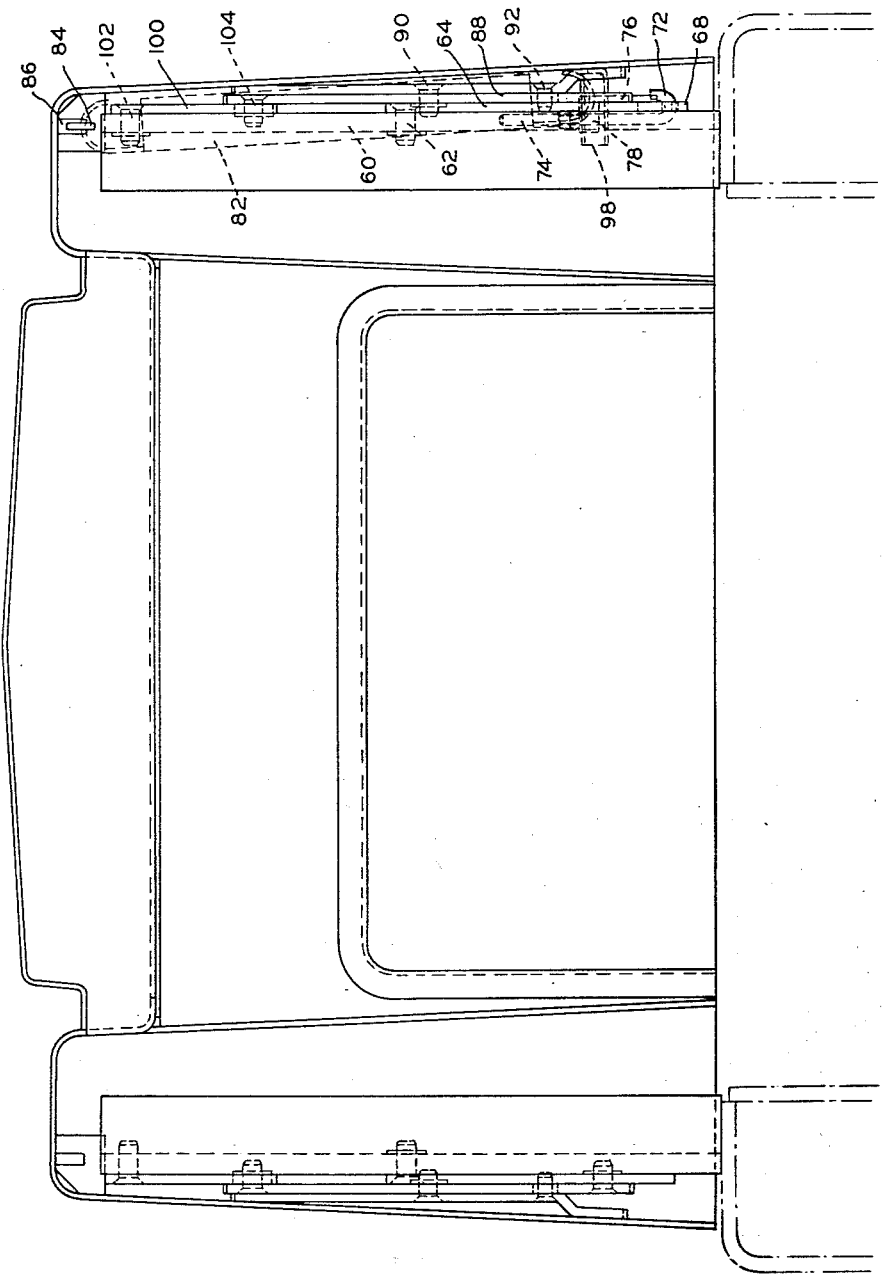
Figure 4 is a rear elevation of the hood member and linkage control mechanism therefor.

Connected to support member 58 is a bifurcated link member 120 having the same general form as link member 64 and pivotally connected to support 58 at 122 and to the hood panel 48 at a pivot means, not shown, located on a bar member similar to member 88. A stabilizing link 124 similar to link 100 is also pivoted on support 58 and the aforementioned bar member to provide a stabilizing linkage connection between the support 58 and hood panel 48 similar to the connection of link member 100 to bar member 88. The bifurcated link 120 aids substantially in providing lateral stability for the hood. A spring mechanism as above described in connection with the description of links 64 and 100 may be provided or not as desired. As shown in Figure 4, the spring loading of my linkage means is shown in combination with links 64 and 100 only, links 120 and 124 being utilized solely for the purpose of stabilizing the position of hood member.

Figure 3:
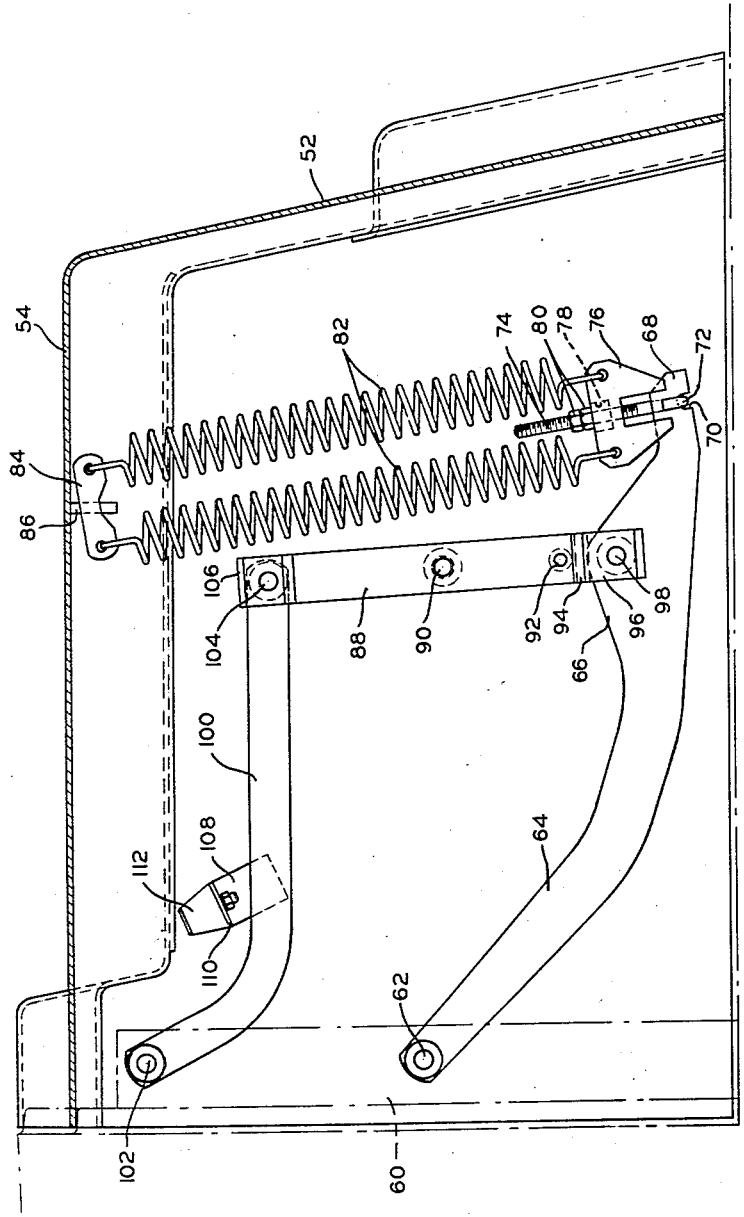
Figure 3 is a side elevation of the hood member and linkage control mechanism therefor.

Referring now particularly to Figure 5, hood member 52 and the various elements of the spring loaded hood linkage means are shown in three different operating positions in which the primary structural elements are numbered as in Figure 3 but carry a prime designation in an intermediate position of the hood 52 and a double prime designation in the full open position thereof. Tracer lines indicate the various paths followed by pivot connections 98 and 104, by the spring end connections of link 64 and to bracket 86, and by the forward lower transverse edge and the rearward lower and upper transverse edges of the hood 52 as it is actuated from a closed to a full open position. The various positions of these elements have been indicated by the letter $a$ when the hood is in a down or closed position, by the letter $b$ when the hood is in an intermediate neutral position, and by the letter $c$ when the hood is in a full open position.

As will be seen from Figure 5 rotation of the hood from a closed to a full open position effects corresponding rotation of the various elements shown about the fixed pivots 62 and 102. It will also be observed that during opening movement of hood 52 no interference takes place between any elements of the linkage means and that the moment of force of spring means 82 about pivot 98 on link 64 decreases at a decreasing rate between the down and intermediate positions $a$ and $b$, respectively, of the hood as the length of spring means 82 decreases at a decreasing rate between positions $a$ and $b$ thereof. As the hood is actuated from an intermediate to a full open position the moment of force of spring means 82 increases somewhat as the length of the spring means again increases between positions $b$ and $c$ thereof, but at a much lesser rate than the prior decrease in the moment force thereof.

Variations in the length of the spring means may be determined by measuring the distance between correspondingly denoted points on the paths of the connected ends of the spring means; i.e., variations in the positions of the connecting ends of the springs, and therefore the lengths of the springs, as the hood is actuated towards open position are denoted by $a$—$a$, $a_1$—$a_1$, $a_2$—$a_2$, et seq., to the position denoted $c$—$c$. The linkage is so designed that the hood opening moment of force tends to decrease between positions $a$ and $b$ of the hood at a rate which corresponds to the decrease in the force moment of the hood about pivots 62 and 102, whereby a substantially constant upward lifting force by an operator will actuate the hood from the down to the intermediate position $b$ thereof, at which the opening moment force is in balance with the gravity moment force of the hood. With the linkage design herein described, and with a particular adjustment of the spring means by means of nuts 80, this balance may be effected at about a 30° elevation of the hood, as shown in position $b$ thereof. As an upward directed force is applied to the hood member at the intermediate position thereof it will pivot rearwardly to position $c$ as the aforementioned transverse edges thereof follow the paths indicated, during which motion springs 82 progressively lengthen an amount equal to approximately one-half the shortening thereof during movement of the hood from position $a$ to position $b$. In practice, stop member 112 on the stabilizing link 100 contacts the top surface of the counterweight 42, as shown in Figure 2, just prior to right angle elevated position of the hood. As the hood is actuated from position $a$ to position $c$ it is apparent that the rearward facing open end thereof passes over the counterweight member 42, as best shown in Figure 2.

When the hood member is lowered from position $c$ to position $a$ it will be apparent that at each noted position thereof the spring means 82 will oppose downward movement with the same force with which said spring means urged the hood member upwardly during lifting movement thereof, thereby assisting the operator during both raising and lowering movement of the hood. This tends to minimize the effort required of an operator in actuating the hood in either direction.

From the above it will be seen that I have invented a novel hood linkage mechanism in novel combination with a hood member and the frame of an industrial truck, said linkage mechanism being adapted to permit the hood member to be actuated through an arc of substantially 90 degrees while minimizing the effort required of an operator to raise and lower the hood.

I am aware that various changes may be made in many of the details of the present construction by persons skilled in the art without departing from the scope of my invention as defined in the appended claims.

I claim:

1. In a motor vehicle having a frame member and a hood member, mechanism connecting said hood member to the frame member comprising a first link pivotally connected to the hood member and to the frame member and extending between the said pivotal connections in a curvilinear path, counterweight spring means connected between said link and the hood member in such a manner that the hood member and link are urged rotationally upwardly about the frame connected pivot when the hood member is in its down position, and a second link pivotally connected to the hood member and to the frame member in vertically spaced relation to said first link and also urged rotationally upwardly with said first link and hood member for stabilizing the position of said hood member relative to said first link.

2. In a motor vehicle, a frame including a pair of laterally spaced and longitudinally extending frame members, a pair of laterally spaced and vertically extending support members fixedly mounted on said frame members adjacent the rear portion thereof, a hood member, separate linkage means connecting said hood member to each of said support members, each of said linkage means comprising a link pivoted at one end on the support member, resilient means connecting the other end of the link to the hood member, and fixed pivot means connecting said link to the hood member intermediate the ends thereof said resilient means opposing gravity effect on said hood member during rotation thereof about said pivoted link end.

3. The mechanism claimed in claim 2 plus a second link pivotally connected to the hood member and to the support member in spaced relation to the first mentioned link for stabilizing the position of said hood member relative to said first mentioned link.

4. In a motor vehicle having a frame member and a hood member, mechanism connecting said hood member to the frame member comprising a link, first pivot means connecting the link to the frame, said link extending generally downwardly and then horizontally from said pivot means, second pivot means connecting the link to the hood member intermediate the ends of the link, and resilient means connecting the end of the link opposite said first pivot means to the hood member, said first and second pivot means being positionally fixed relative to said frame and said hood member, respectively, and said resilient means opposing gravity effect on said hood member during rotation thereof about said first pivot means.

5. In an industrial truck, a frame including a pair of laterally spaced and longitudinally extending frame members, vertically extending counterweight means mounted on the truck rearwardly of said frame members, a generally box-shaped hood member comprising a plurality of connected surfaces defining an open end adjacent said counterweight, said hood member being adapted to overlie a substantial longitudinal portion of said frame members, support means fixedly mounted on said frame members adjacent the rear portions thereof, linkage means pivotally connected both to the support means and to the hood member, said hood member being rotationally actuatable with said linkage means from a generally horizontal to a generally vertical position relative to the frame, in which latter position a vertically extending portion of said counterweight is bounded by the connected surfaces of said hood member.

6. An industrial truck as claimed in claim 5 plus resilient means connecting said linkage means to the hood member so as to oppose gravity effect on said hood member during rotation thereof with said linkage means.

7. An industrial truck as claimed in claim 5 wherein a stop member is connected to said linkage means and is adapted to abut said counterweight for limiting the amount of angular rotation which may be imparted to the hood member during actuation thereof towards a vertical position.

8. In combination, a movable hood member, a fixed support member, first and second pivot means mounted on said support member, first and second generally vertically spaced link means pivotally mounted on said first and second pivot means, respectively, and extending longitudinally outwardly therefrom in generally curvilinear paths, resilient means connecting said hood member to said first link, and third and fourth pivot means connecting said hood member to said first and second links, respectively, said resilient means being connected to said first link longitudinally outwardly of said third pivot means and being adapted to oppose gravity effect on said hood member during rotation of said first and second links about said first and second pivots and consequent rotation of said hood member about said first, second, third and fourth pivot means.

9. In an industrial truck, a frame including a pair of laterally spaced and longitudinally extending frame members, vertically extending counterweight means mounted on the truck rearwardly of said frame members, a generally box-shaped hood member comprising a plurality of connected surfaces defining an open end adjacent said counterweight, said hood member being adapted to overlie a substantial longitudinal portion of said frame members, at least one vertically extending support member fixedly mounted on one of said frame members adjacent the rear portion thereof, and linkage means connected to said support member and to said hood member comprising first and second pivot means mounted on said support member, first and second generally vertically spaced link means pivotally mounted on said first and second pivot means, respectively, and extending longitudinally outwardly therefrom within said hood member, resilient means connecting said hood member to said first link, and third and fourth pivot means connecting said hood member to said first and second links, respectively, said hood member being rotatably actuatable about said first and second pivot means from a generally horizontal to a generally vertical position relative to the frame, in which latter position a vertically extending portion of said counterweight is bounded by the connected surfaces of said hood member.

10. An industrial truck as claimed in claim 9 wherein said resilient means is connected to said first link longitudinally outwardly of said third pivot means and is adapted to oppose gravity effect on said hood member during rotation thereof about said first and second pivot means.

References Cited in the file of this patent

UNITED STATES PATENTS

| | | |
|---|---|---|
| 2,162,135 | Tell | June 13, 1939 |
| 2,229,315 | Sullivan | Jan. 21, 1941 |
| 2,256,314 | Dunham | Sept. 16, 1941 |
| 2,548,492 | Rivard et al. | Apr. 10, 1951 |
| 2,759,563 | Marnon | Aug. 21, 1956 |
| 2,791,348 | Adams | May 7, 1957 |

FOREIGN PATENTS

| | | |
|---|---|---|
| 293,148 | Great Britain | July 5, 1928 |
| 622,046 | Great Britain | Apr. 26, 1949 |